(12) United States Patent
Fayfield

(10) Patent No.: US 6,285,021 B1
(45) Date of Patent: Sep. 4, 2001

(54) SELF CHECKING SAFETY SWITCH

(75) Inventor: Robert W. Fayfield, Excelsior, MN (US)

(73) Assignee: Banner Engineering Corp., Minneapolis, MN (US)

( * ) Notice: Subject to any disclaimer, the term of this patent is extended or adjusted under 35 U.S.C. 154(b) by 0 days.

(21) Appl. No.: 09/361,873

(22) Filed: Jul. 27, 1999

(51) Int. Cl.[7] ...................................................... G01D 21/04
(52) U.S. Cl. .................... 250/221; 250/222.1; 340/555
(58) Field of Search ............................ 250/221, 222.1, 250/208.4; 307/116, 117, 113; 340/555, 556, 557; 361/173, 177, 179, 189

(56) References Cited

U.S. PATENT DOCUMENTS

| | | | |
|---|---|---|---|
| 3,805,085 | 4/1974 | Andrews ................................ | 307/115 |
| 3,914,621 | 10/1975 | Passarelli, Jr. ......................... | 307/113 |
| 3,932,746 | * 1/1976 | Swanson ................................ | 250/221 |
| 4,180,726 | * 12/1979 | DeCrescent ........................ | 250/222.1 |
| 4,666,099 | * 5/1987 | Hoffman et al. ..................... | 242/55.53 |
| 4,939,358 | 7/1990 | Herman et al. ....................... | 250/221 |
| 5,077,467 | 12/1991 | Barron, Jr. et al. ................... | 250/221 |
| 5,410,148 | 4/1995 | Barron, Jr. et al. ................... | 250/221 |
| 5,845,077 | 12/1998 | Fawcett ............................ | 395/200.51 |

OTHER PUBLICATIONS

Bulletin entitled "Bulletin 800Z —Zero–Force™ Touch Buttons", *Allen–Bradley*, pp. 1–19 (June 1999).
Competitive Comparison: "Allen–Bradley Zero–Force™ Touch Button Bulletin 800Z" and "Banner OPTO-TOUCH™", *Rockwell Automation* 4 pgs. (Jun. 1999).

\* cited by examiner

*Primary Examiner*—Stephone B. Allen
(74) *Attorney, Agent, or Firm*—Merchant & Gould P.C.

(57) ABSTRACT

A hand operated optical touch button switch configured for insertion of a human hand into an opening. The opening having a beam of light emitted from an emitter and traveling to a photo detector. The housing includes switching circuitry for operating a controller coupled to a relay which actuates the operation of electrical machinery. The switching circuitry also includes a self check circuit adapted to continuously provide feedback regarding proper function of all components comprising the optical touch button switching circuitry. The continuous feedback provided by the self check circuitry generates data within the output signal that informs the controller of component failures which may result in unintended actuation of a machine to which the switch is coupled when the human hand is not inserted in the opening of the switch housing.

19 Claims, 3 Drawing Sheets

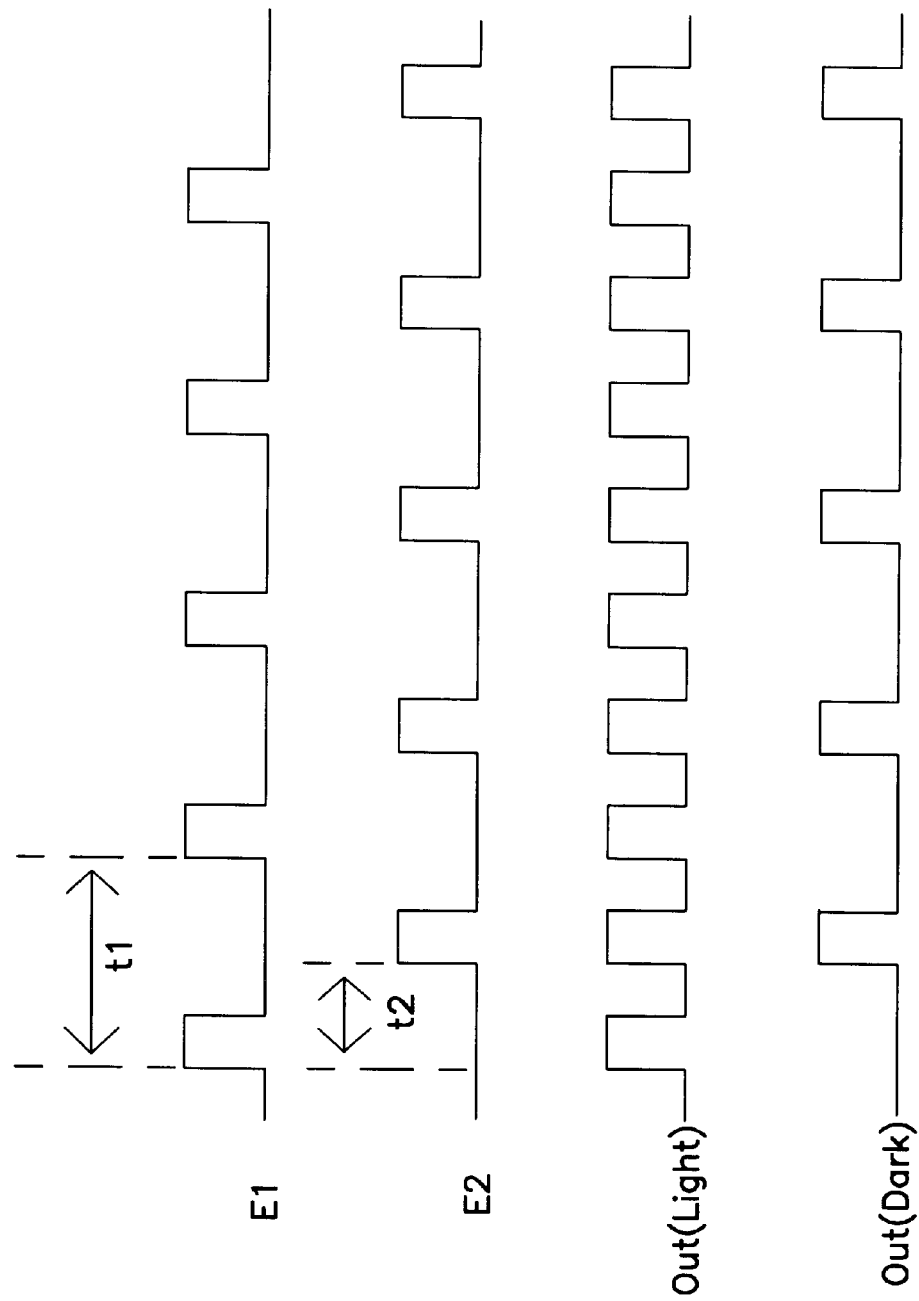

SELF CHECKING SAFETY SWITCH

FIELD OF THE INVENTION

This invention relates generally to switches used to control power to an industrial machine and more particularly to a switching system having self checking capabilities.

BACKGROUND OF THE INVENTION

Optical touch button switches are non-contact, zero-pressure replacements for mechanical push button switches used in applications where an operator must repeatedly actuate a device, sometimes thousands of times per shift. Optical touch button switches are typically used in an industrial environment on machines such as punch presses, press brakes, shears, riveting machines and molding presses. Industrial machines including mechanical push buttons require an operator to overcome the spring-return force of the button, which has been said to cause repetitive stress disorders such as carpal tunnel syndrome.

Optical touch button switches typically consist of a U-shaped housing in which a beam of light is projected across the gap. When a finger or hand is placed in the gap, the beam is broken and the control function is initiated. An example of an optical touch button switch is disclosed in U.S. Pat. No. 4,939,358. The problem with optical touch button switches such as that disclosed in U.S. Pat. No. 4,939,358, is that such switches can be triggered unintentionally. Typically, false triggering of optical switches is caused by an operator sleeve, insects or dust breaking the light beam projected across the gap of the U-shaped housing. Also, in spite of the safety precautions, some operators will attempt to trick the switches by placing an object in the switch opening to trip the optical switch.

Since one application for an optical touch button switch is to operate heavy machinery in an industrial environment (such as punch presses), various regulatory requirements exist to assure that the machinery will not be inadvertently operated. One of the requirements is that two initiating devices be used in a configuration that requires the operator to place both hands on the initiating devices in order to initiate the machine function. Further, the requirements state that both hands must be placed on the initiating devices simultaneously and that, if either hand is removed, the machine must be immediately stopped.

Various ancillary control circuits have been developed to meet these regulatory requirements, and they are generally referred to as anti-tie-down circuits. The function of an anti-tie-down circuit is to prevent the operator from tying down one of the actuating devices in order to have a free hand to insert work pieces into dangerous areas on the machine. These anti-tie-down circuits are themselves subject to various regulatory requirements to assure that failures within the anti-tie-down circuit do not cause inadvertent operation of the machine. In fact, the reliability of the anti-tie-down circuit is of more significance than the reliability of the actuating devices, because if properly designed, the anti-tie-down circuit requires simultaneous operation of both actuating devices. Thus, if one actuating device false operates, no action is taken, and the probability of both actuating devices false operating simultaneously is low. Notwithstanding the reliability of anti tie-down circuitry in a general application, there is always a desire to improve the reliability of the entire system. Thus, attention is paid to the design of the initiating devices, particularly when they are electronic rather than mechanical. Previous systems such as those disclosed in U.S. Pat. No. 5,410,148 and U.S. Pat. No. 5,077,467 have attempted to provide redundancy and fault monitoring. However, these systems have not provided a solution that can pass a failure mode effects analysis. The primary reason the solutions provided by the above referenced prior systems could not pass a failure mode effects analysis is that the monitoring circuits that monitor internal device functions are not control reliable. There is a need for an optical switch having internal device monitoring functions that has a second monitoring circuit that monitors the internal device monitoring circuit. Such a system is needed so that component failure in the internal monitoring circuit does not cause false actuation of a machine, but provides information to a separate controller that prevents the machine from operating until the detected failure within the monitoring circuit is repaired.

There are a number of failure mode possibilities in optical touch button or capacitive touch plate switches that can lead to false actuation. For example, a light source or photo detector failure will, in most cases, result in a dark condition, just as if a hand or finger had been placed in the gap of the U-shaped housing. There are also many failure modes of electronic components that drive the light source which could cause a dark condition. There are also many failure modes of electronic components that amplify the photo detector signal that could cause a dark condition. U.S. Pat. No. 5,077,467 attempts to solve these problems by monitoring the light emitting diode and the driver transistor adapted to control a mechanical relay. However, there is no attempt to monitor the monitoring circuitry to determine if failures occur in that circuitry. There is a need for a system to provide assurance that all of the electrical components that comprise the sensing system are operational in the dark condition. Such a system would need to actively monitor the circuitry controlling the light emitting and light receiving functions as well as the circuitry monitoring the light emitting and light receiving circuitry. In such a system, failure of any components can be detected so that false triggering of the switch or continued actuation of the industrial machine after a hand or finger is removed from the housing of the switch does not occur.

SUMMARY OF THE INVENTION

The present invention comprises a safety switch including disabling fail safe monitoring circuitry adapted to provide an actuation signal to a machine to which the safety switch is coupled. The switch provides an actuation signal when a hand engages the switch housing. The switch housing includes an opening configured for insertion of a human hand into the opening. Within the switch housing is switching circuitry which includes at least a primary emitter that emits a detectable signal, an oscillator coupled to the primary emitter that applies pulses of current to the primary emitter, a primary detector for detecting the detectable signal emitted by the primary emitter, and a self check circuit coupled to the primary emitter and primary detector. The self check circuit comprises a secondary detector for detecting the detectable signal emitted from the primary emitter, a function generator coupled to the secondary detector and configured to modify a signal generated by the secondary detector and transmit a modified signal to a secondary emitter that emits a signal that is detected by the primary receiver. The primary receiver produces a signal comprised of combining the signal emitted by the primary emitter and the signal emitted by the secondary emitter upon the insertion of the human hand into the opening within the switch housing. The signal produced by the primary receiver comprises the safety switch output signal.

BRIEF DESCRIPTION OF THE DRAWINGS

FIG. 4 is a timing diagram useful for illustrating the self-checking function of the present invention.

GENERAL DESCRIPTION

Figure 1:
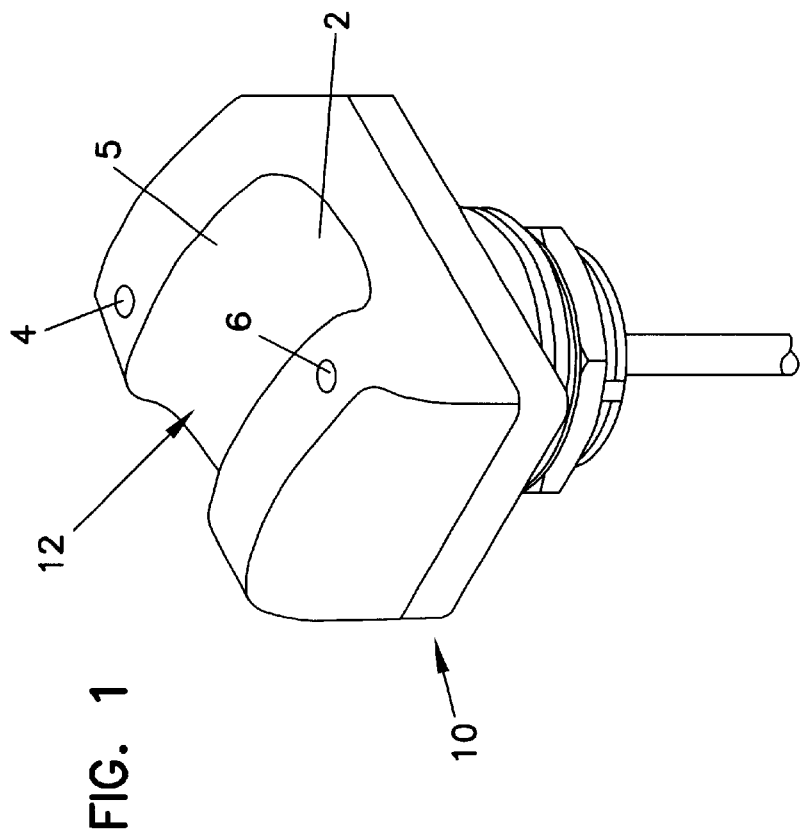
FIG. 1 is a perspective view of the optical touch button switch.

Referring to FIG. 1, the present invention is a hand-operated, optical touch-button switch including self monitoring circuitry. The self monitoring circuitry is adapted to continuously provide feedback regarding proper function of all components compromising the optical touch button switching circuitry. Such a switch assembly can be used for cycling heavy industrial machinery, such as stamping presses, rivitors, spot welders and the like. The switching circuitry is housed within a housing 10 that includes a U-shaped opening 12 dimensioned to accept the entry of a human hand. Typically, because of regulatory requirements, two switch assemblies are coupled together in a machine-controlled system, in a manner well-known in the art, such that machine control requires actuation of both optical touch-button switches 10. The optical touch-button switches 10 are electrically connected to industrial machinery and the output of the optical touch button switch actuates the industrial machinery upon the activation of the switch. Each optical touch button switch is actuated by way of entry of a human hand into the U-shaped opening 12 which breaks a light beam (not shown) extending across the U-shaped opening 12. The U-shaped opening 12 within the housing 10 is adapted for the edge wide insertion of the hand or fingers. The U-shaped opening has a bottom wall 2 and two side walls 3 and 5 that meet the upper planar surfaces of the housing 10.

Figure 2:
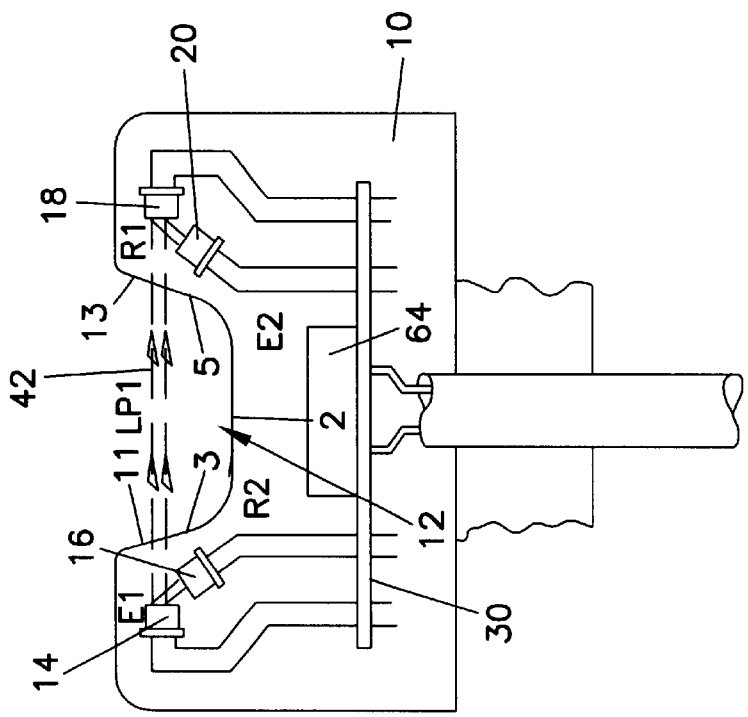
FIG. 2 is a side view of the optical touch button switch illustrating a block diagram of the electrical circuitry and the light flow path.

As FIG. 2 illustrates generally, the optical touch button switching circuitry contained within the housing 10 includes at least a primary emitter 14 that emits a detectable signal, a primary detector 18 for detecting the detectable signal and a self check circuit. The self check circuit is comprised of at least a secondary detector 16 for detecting said detectable signal emitted from the primary emitter 14 and a secondary emitter 20. The secondary detector 16 generates a signal that energizes the secondary emitter 20 that emits a signal that is detected by the primary receiver. The signal transmitted by the secondary emitter 20 is modified so that when the primary detector 18 detects the signals from primary emitter 14 and secondary emitter 20, the signals are distinguishable. Accordingly, if there is fault in operation of a component along the path of signal travel between secondary detector 16 and secondary emitter 20, the control circuitry into which the resulting signal is transmitted will be able to detect a problem because the signal received from primary detector 18 will not be as anticipated when the switching circuitry is functioning with no errors. Also, if there is a problem with the components along the path of signal travel between the primary emitter 14 and the primary detector 18, the signal transmitted by the primary detector 18 and received by the control circuitry will not be as anticipated when the switching circuitry is functioning with no errors. Accordingly, defects in components along either primary or secondary signal travel paths can be detected and used to render the switch inoperable until the problem is resolved.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DETAILED DESCRIPTION OF THE PREFERRED EMBODIMENTS

In the following detailed description of the preferred embodiment, reference is made to the accompanying drawings which form a part hereof and in which is shown by way of illustration an exemplary embodiment and a description having sufficient detail to enable those skilled in the art to practice the invention.

A safety switch including the self monitoring circuitry of the present invention, comprises a hand-operated, optical touch-button switch assembly having switching circuitry of at least the type shown in FIG. 2. The primary emitter 14 of the switching circuitry is positioned in close proximity to side wall 3 which has an orifice 11 through which the light emitting from the primary emitter 14 may pass. The primary detector 18 is positioned in close proximity to side wall 5 and has an orifice 13 through which the light emitting from the primary emitter 14 travels in accordance with the illustrated light transmission path 42. The spacing of the primary emitter 14 and the primary detector 18 above the bottom wall 2 is adapted to be a distance sufficient so that small fingers or a user's hand can move to interrupt the beam traveling along light transmission path 42 between the primary emitter 14 and the primary detector 18, such that small fingers are prevented from moving downwardly past and thereby underneath the light beam traveling along light transmission path 42. This spacing creates an environment in which the light beam will always be broken upon insertion of fingers of any size into the U-shaped opening and prevents inoperation due to smallness of fingers and allows a user to rest fingers of any size on bottom wall 2 and maintain operation.

As FIG. 1 illustrates, on the upper walls are located light emitting diodes 4 and 6 which act as an output indicator 6 and a power on indicator 4. When the power is on, indicator 4 is illuminated. In the exemplary embodiment, the power on indicator light emitting diode 4 is green. When the beam traveling along light transmission path 42 is obstructed, then the light emitting diode 6 is illuminated indicating that the optical touch button switch is sending an output signal to the output controller and relay coupled to the industrial machinery input that needs to be activated. In the exemplary embodiment, the output indicator light emitting diode 6 is yellow.

It is to be understood that in other embodiments, the LEDs 4 and 6 may be of different colors. It is also to be understood that other embodiments may utilize an intermediary structure other than an output controller and relay as the intermediary electrical coupling and control apparatus linking the optical touch button switch and the industrial machinery without departing from the scope of the present invention.

In operation in an industrial environment, typically, two optical touch button switches are electrically connected to a controller, which is an anti tie-down logic module (not shown) circuit in the present embodiment. The anti tie-down logic module circuit is coupled to a relay or relays. The anti tie-down logic module receives the output pulse signal from the primary detector and determines, based on the output pulse signal, whether there are component failures within the optical touch button switch circuitry. If there are no component failures, the anti tie-down logic module engages the relay(s) that energize the associated industrial machine control circuitry. The electrical circuitry for the particular machinery is electrically connected with the mechanical relay(s) to cycle the machinery in the particular way in which it might operate. It is to be understood that the mechanical apparatus and its electrical circuitry form no part of the present invention. Upon insertion of a hand or finger into the U-shaped opening 12, the optical touch button switch emits a signal that actuates relay(s) electrically connected to the industrial machinery.

Referring to FIG. 2, wherein a block diagram of the circuitry for an optical touch-button switch having self checking capability is disclosed, a primary emitter 14, which may be an infrared LED, is used as the light source. The light emitting from the primary emitter 14 is aimed so as to project a beam of light along a path 42 across the U-shaped gap 12 of the housing 10. The optical touch button switch circuitry also includes an oscillator (not shown), which provides pulses of current to primary emitter 14. Pulsating current is generally used to provide modulated primary emitter 14 operation to avoid interference from ambient light, as is well known in the art. The primary receiver 18, which may be a photo transistor or a photo diode, is located at the opposite side of the U-shaped housing 12 so as to receive the light pulses from the primary emitter 14 that are traveling along light transmission path 42, if the gap is unobstructed. The light pulses from the primary emitter 14 are also detected by a secondary receiver 16 which generates an output signal that is received by a function generator (not shown) that modifies the pulsating output signal in some way. The modified output signal from the function generator is electrically coupled to a secondary emitter 20 that emits light pulses in accordance with the modified pulsation signal received from the function generator. Primary receiver 18 receives the light pulses from the secondary emitter 20 and generates an output signal representative of the light pulses from the primary emitter 14 and the secondary emitter 20 combined. The output pulse signal generated by the primary receiver 18 is illustrative of faults in the primary emitter 14, primary receiver 18 and self-check circuitry, which includes at least the secondary receiver 16, function generator 64 and the secondary emitter 20. Accordingly, this configuration provides an indication of faults in the primary emitter 14 as well as the self check monitoring circuitry. This provides for accurate self monitoring, and prevents inaccurate monitoring as a result of failures in the monitoring circuitry.

Figure 3:
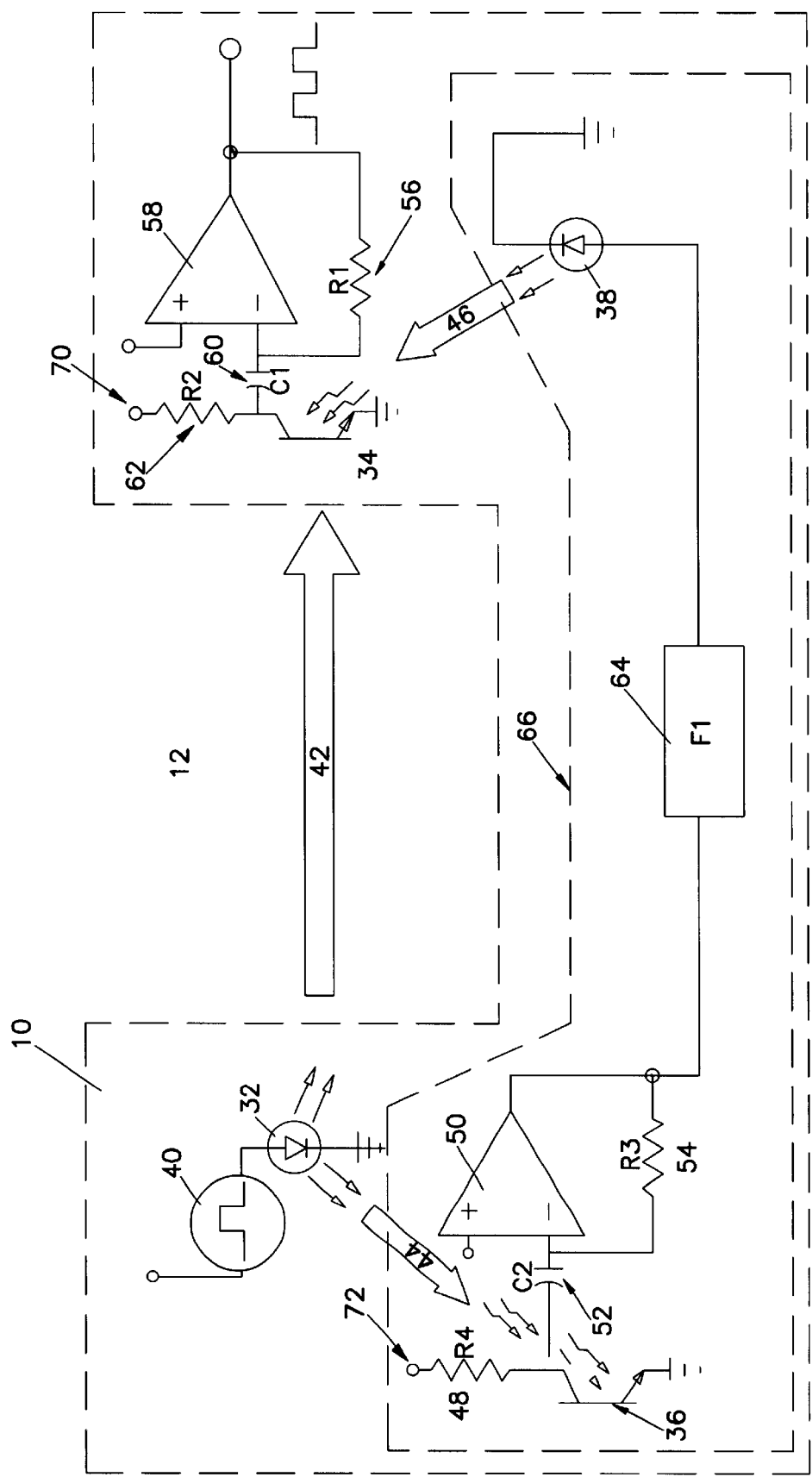
FIG. 3 is a diagram of an embodiment of the circuitry of the optical touch button switch of the present invention.

Referring to FIG. 3, which illustrates a more detailed disclosure of an embodiment of the circuitry that comprises the present invention, the primary emitter, an infrared LED 32, is used as the light source. It is positioned so as to project a beam of light along a transmission path 42 across the gap of the U-shaped housing 12. An oscillator 40 provides pulses of current to primary emitter LED 32. Pulsing current is generally used to provide modulated LED operation to avoid interference from ambient light, as is well known in the art. The primary receiver 34, is a photo transistor, and is located at the opposite side of the U-shaped housing so as to receive the infrared light pulses from primary emitter LED 32 if the gap is unobstructed. An amplifier 58 is the primary amplifier, which amplifies the pulses received by photo-transistor 34 to a level high enough to be transmitted to further processing circuitry such as that which might be included in an anti tie-down controller.

In normal operation of an optical touch button switch that does not include monitoring circuit 66, the output pulse train transmitted by the optical touch button switch is a duplicate of the oscillator 40 pulse train when the beam is unobstructed (the light condition), and the output is not pulsating at all when the beam is obstructed (the "dark" condition). It can be seen that without the monitoring circuit 66, a failure of oscillator 40 to provide pulsating current to LED 32, or a failure of LED 32 to emit light due to a bond, wire or circuit trace break, or a failure of photo-transistor 34 to convert the received light into an electrical signal, or the failure of the primary amplifier 58 to amplify the signal from photo-transistor 34 would result in an output signal representative of a dark condition. This failure would then produce an unintended input to the anti tie-down circuit, incorrectly indicating that a hand is in the U-shaped opening.

While such a failure alone would not operate the machine, the failure might occur during the time in which the operator's hand is already in the gap of the U-shaped housing. If so, it would be possible for the operator to remove that hand from the gap within the optical touch button switch housing and insert that free hand into a dangerous area on the operating industrial machine. The failed optical touch button switch would not sense that the light condition had returned, and would not stop operating the machine. The invention prevents such a condition or sequence of events from occurring.

In operation, an oscillator 40 provides pulses of current to the primary emitter, LED 32. Oscillator 40 may be any of several common oscillators, such as the "555" type timer integrated circuit. The pulses of current supplied to the primary emitter LED 32 is typically of several microseconds in duration, for example, 10 microseconds, and is repeated within a period of several hundred microseconds, for example, 250 microseconds. Each pulse of current generated by the oscillator 40 is typically of several hundred miliamps in amplitude, and passes through the primary emitter LED 32 to produce light pulses of similar duration and period. The light pulses generated by the primary emitter LED 32 are transmitted across the U-shaped housing 12 along light transmission path 42 to the primary receiver 34 which in the present embodiment is a photo transistor. The photo transistor 34 is connected through a resister 62 to a source of dc voltage 70. In the present embodiment, the source of dc voltage 70 is 5 volts. The pulses of light transmitted by the primary emitter LED 32 causes the primary receiver 34 to momentarily draw current through resister 62, resulting in a pulse of voltage across resister 62. This pulse of voltage is capacitively coupled to a primary amplifier 58 through a capacitor 60 to form a high pass filter that permits pulsed signals such as those generated by the oscillator 40 to pass through to the primary amplifier 58, while pulsed signals having low frequency and dc signals, such as those generated by sunlight and artificial non-pulsed light are blocked. The primary amplifier 58 is a typical operational amplifier that amplifies and inverts the pulse signal from the photo transistor (primary emitter) 34. The gain of the primary amplifier 58 is equal to the value of resister 56 divided by the impedance of the photo transistor 34 (primary emitter).

The monitoring circuit 66 is also driven off of the pulses of light generated from the primary emitter LED 32. The light pulses that drive the monitoring circuit are represented as light transmission path 44. The light transmission path 44 of pulsed light from the primary emitter LED 32 is a secondary beam of light that travels inside of the housing of the optical touch button switch and is similar to the light pulses transmitted along light transmission path 42. The light pulses traveling along light transmission path 44 are received by a secondary receiver 36 which is a photo transistor. The secondary receiver 36 is mounted in such a manner so that it can receive light traveling only along light transmission path 44 and cannot receive light from external sources. The secondary receiver 36 is connected through resister 48 to a dc voltage 72. In the present embodiment, the dc voltage is 5 volts. The pulses of light received by the secondary receiver 36, causes it to momentarily draw more current through resister 48, resulting in a pulse of voltage across resister 48. This pulse of voltage is capacitively coupled to a secondary amplifier 50 through a capacitor 52, to form a high pass filter that permits pulsed signals such as those generated by the oscillator 40 to pass through the amplifier 50 while blocking low frequency and dc voltages, such as those generated by sunlight and artificial non-pulsed light. The secondary amplifier, which is an operational amplifier, amplifies and inverts the pulse signal from secondary receiver 36 and has a gain that is equal to the value of resister 54 divided by the impedance of the photo transistor 36. The amplified signal exiting the secondary amplifier 50 is input into a function generator 64 which can be any of a plurality of circuits, including micro processors. Function generators 64 are well known in the art and have the ability to generate one or more pulses upon being triggered by an input event such as that provided at the output of the secondary amplifier 50. Examples of functions that could be generated by the function generator 64 include, but are not limited to: a single pulse similar to that at the output of secondary amplifier 50, but delayed in time by a fixed amount "t"; a train of "n" pulses triggered by the delayed output of secondary amplifier 50; or a serially transmitted "word" of, for example, 8 bits, triggered by the delayed output of the secondary amplifier 50 and using conventional techniques for serial data transmission, such as wide and narrow pulses to represent zeros and ones. The signal generated by function generator 64 is transmitted to a secondary emitter 38, which in the present embodiment is an infrared LED. Secondary emitter LED 38 operates in a manner similar to primary emitter LED 32 in generating infrared light pulses. The infrared light pulses generated by secondary emitter LED 38 travel along light transmission path 46 and are directed to photo transistor 34, the primary receiver. The light transmission path 46 is an internal light transmission path and configured so as to prevent light from the secondary emitter LED 38 from reaching the secondary receiver 36. The pulses of infrared light that reach the primary receiver 34 from the secondary emitter LED 38 are amplified by the primary amplifier 58 along with the pulses received by the primary receiver 34 from the primary emitter LED 32 along transmission path 42, such that the output of amplifier 58 is a combined signal of the original pulse emitted by the primary emitter LED 32 and the secondary delayed pulse or pulse train launched by the secondary emitter LED 38.

Referring to FIG. 4, a timing diagram of the light pulses generated by the primary emitter LED 32 and secondary emitter LED 38 are illustrated. E1 is the pulse representation of the light pulse generated by the primary emitter LED 32 traveling along light transmission paths 42 and 44. T1 is the period of the pulses. E2 is a representation of the infrared light pulses generated by the primary emitter LED 32 that are delayed by a time T2. E2 is also representative of the infrared light pulses generated by the secondary emitter LED 38 and traveling along light transmission path 46. E2 is delayed by a time T2 as a result of the function generator delaying the pulse train from E1 and powering the secondary emitter LED 38 so that it emits a delayed light pulse along light transmission path 46. Out(light) is the resultant light pulse transmitted out of the primary amplifier 58 when the housing gap 12 is unobstructed. Out(dark) is the resultant output from primary amplifier 58 when the housing gap 12 is obstructed by insertion of a hand or finger into the light transmission path 42.

The output signal from the primary amplifier 58 out(light) or out(dark) is directed to a separate anti tie-down controller, which includes the ability to monitor the pulse train and determine if the optical touch button switch output is in the light or dark condition, or in any other condition which would be interpreted as a fault. The configuration of the anti tie-down circuit is well known in the art, and is typically predicated on the use of diverse-redundant micro controllers, each checking the other, and each looking for the specific pulse trains disclosed in FIG. 4. The anti tie-down controller will only generate a start output to the machine when it sees the exact pulse train out(dark) illustrated in FIG. 4. The anti tie-down controller is performing a failure mode effect analysis on the output signal resulting from the operational amplifier 58. There are a number of possible failure modes that the anti tie-down circuit can determine has occurred in the optical touch-button switch based on the output pulse train received from the primary amplifier 58. Those failure modes are disclosed in table 1 illustrated below.

TABLE 1

| EVENT | RESULTANT OUTPUT |
| --- | --- |
| Power failure | no pulses |
| OSC-1 output stuck low or high | no pulses |
| E1 failure open or short | no pulses |
| R2 failure open or short | no pulses in dark condition |
| A2 failure open, short, low gain | no pulses in dark condition |
| F1 failure | no pulses in dark conditions or misplaced pulses |
| E2 failure open or short | no pulses in dark condition |
| R1 failure open or short | no pulses |
| A1 failure open, short, low gain | no pulses |
| Broken wires to ATD controller | no pulses |
| Shorted wires to ATD controller | no pulses |

Note that the failure modes illustrated in the table 1 above do not limit the function generator 64 to merely applying a delay to the pulse originating from the primary emitter LED 32. If the function generator 64 is a simple micro controller, the modification of the pulse train can be quite profound. For example, in another embodiment, the modification of the pulse train can be such that it transmits an 8 bit word between the pulses representative of E1 so that the anti tie-down control circuitry is even more reliable in selecting the correct pulse train from signals that might be in a high noise electrical environment. It is to be understood that in other embodiments, the oscillator 40 and the function generator 64 can be incorporated into a single microprocessor so that the output signal from the primary amplifier 58 in both the obstructed and unobstructed conditions can be generated in the best way specific to a particular product and the respective electrical noise environment.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure in arrangements of parts within the principles of the present invention to the full extent indicated by the broad general meaning of the terms in which the appended claims are expressed. For example, the particular elements may vary depending on the level of accuracy required and the electrical noise environment in which the switch operates while maintaining substantially the same functionality without departing from the scope of the present invention.

What is claimed is:

1. A safety switch for controlling power to a machine, comprising:
    a housing having an opening configured to allow for insertion of a human hand into said opening and self checking switch circuitry contained within said housing, said self checking circuitry comprising:
    a primary emitter that emits a first detectable signal;
    primary monitoring circuitry coupled to said primary emitter that detects said first detectable signal and generates a second detectable signal;
    a primary detector coupled to said primary monitoring circuitry for detecting said first detectable signal and said second detectable signal and adapted to generate an output signal comprised of a combination of said first and second detectable signals;
    said output signal controlling application of power to the machine.

2. The safety switch as in claim 1 wherein said switching circuitry includes an oscillator adapted to transmit pulses of current to said primary emitter.

3. A safety switch for controlling power to a machine, comprising:
    a housing having an opening configured to allow insertion of a human hand into said opening;
    switch circuitry contained within said housing, comprising:
        a primary emitter that emits a detectable signal;
        a primary detector for detecting said detectable signal; and
        a self check circuit, coupled to said primary emitter and said primary detector, said self check circuit comprising a secondary detector for detecting said detectable signal emitted from said primary emitter, said secondary detector generating a signal that energizes a secondary emitter, said secondary emitter emitting a signal that is detected by said primary receiver;
    said switch circuitry producing an output signal upon the insertion of said human hand into said opening.

4. The safety switch as in claim 3 wherein the primary emitter is a light emitting diode.

5. The safety switch as in claim 3 wherein the primary detector is a photo transistor.

6. The safety switch as in claim 3 wherein the primary detector is a photo diode.

7. The safety switch as in claim 3 wherein the secondary emitter is a light emitting diode.

8. The safety switch as in claim 3 wherein the secondary detector is an infrared photo transistor.

9. The safety switch as in claim 3 wherein the secondary detector is a photo diode.

10. The safety switch as in claim 3 wherein said self check circuit includes a function generator coupled to said secondary detector and adapted to modify said generated signal received from said secondary detector and transmit a modified signal to said secondary emitter.

11. A hand-operated safety switch adapted to actuate a machine to which the switch is coupled when a hand engages the housing, the switch comprising:
    a housing having an opening configured for insertion of a human hand into said opening and switching circuitry contained within said housing comprising;
    a primary light emitting means for emitting a first beam of light along a first light transmission path;
    a primary sensor means being electrically responsive to said first beam of light traveling along said first light transmission path;
    a secondary sensor means being electrically responsive to said beam of light traveling along a second light transmission path from said primary light emitting means wherein said secondary sensor means generates a signal that energizes a secondary light emitting means;
    said secondary light emitting means for emitting a second beam of light along a third light transmission path in response to said signal generated by said secondary sensor;
    said primary sensor means being electrically responsive to said secondary beam of light traveling along said third light transmission path;
    said primary sensor means combining said first beam of light and said second beam of light to produce an output signal that controls actuation of the machine.

12. The safety switch as in claim 11 wherein the primary light emitting means is a light emitting diode.

13. The safety switch as in claim 11 wherein the primary sensor means is a phototransistor.

14. The safety switch as in claim 11 wherein the primary sensor means is a photo diode.

15. The safety switch as in claim 11 wherein the secondary light emitting means is a light emitting diode.

16. The safety switch as in claim 11 wherein the secondary sensor means is a phototransistor.

17. The safety switch as in claim 11 wherein the secondary sensor means is a photo diode.

18. The safety switch as in claim 11 further comprising a means for modifying said signal from said secondary sensor means, said means coupled to said secondary light emitting means and adapted to generate a modified signal that is transmitted to said primary light receiving means.

19. The safety switch as in claim 11 wherein said switching circuitry includes a means for applying pulses of current to said primary light emitting means.

* * * * *